(12) United States Patent
Kim (10) Patent No.: US 11,007,829 B2
(45) Date of Patent: May 18, 2021

(54) APPARATUS AND METHOD FOR CONTROLLING STEERING OF PLATOONING VEHICLE

(71) Applicants: Hyundai Motor Company, Seoul (KR); Kia Motors Corporation, Seoul (KR)

(72) Inventor: Dong Hyuk Kim, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 234 days.

(21) Appl. No.: 16/287,183

(22) Filed: Feb. 27, 2019

(65) Prior Publication Data

US 2020/0139774 A1  May 7, 2020

(30) Foreign Application Priority Data

Nov. 7, 2018 (KR) .................. 10-2018-0136086

(51) Int. Cl.
*B60D 1/30* (2006.01)
*G08G 1/00* (2006.01)
*G06F 17/11* (2006.01)
*G05D 1/02* (2020.01)
*G01C 21/34* (2006.01)

(52) U.S. Cl.
CPC ............ *B60D 1/30* (2013.01); *G05D 1/0295* (2013.01); *G06F 17/11* (2013.01); *G08G 1/22* (2013.01); *G01C 21/3407* (2013.01); *G05D 2201/0213* (2013.01)

(58) Field of Classification Search
CPC ........... B60D 1/30; G05D 1/0295; G05D 2201/0213; G06F 17/11; G08G 1/22; G01C 21/3407
USPC ............................................. 701/1
See application file for complete search history.

(56) References Cited

U.S. PATENT DOCUMENTS

| | | | |
|---|---|---|---|
| 7,904,222 B2* | 3/2011 | Lee ............... | G01S 13/87 701/41 |
| 2018/0188725 A1* | 7/2018 | Cremona ......... | G01S 19/13 |
| 2018/0211546 A1* | 7/2018 | Smartt ............ | G05D 1/0088 |
| 2019/0147263 A1* | 5/2019 | Kuehnle .......... | G07C 5/0808 340/439 |
| 2019/0249552 A1* | 8/2019 | Tessien ........... | B28B 21/60 |
| 2020/0139774 A1* | 5/2020 | Kim ................ | G06F 17/11 |
| 2020/0201356 A1* | 6/2020 | Schuh ............. | B60T 7/12 |
| 2020/0324763 A1* | 10/2020 | Switkes ........... | G08G 1/161 |

* cited by examiner

*Primary Examiner* — Peter D Nolan
*Assistant Examiner* — Wae L Louie
(74) *Attorney, Agent, or Firm* — McDonnell Boehnen Hulbert & Berghoff LLP (57) ABSTRACT

The present disclosure relates to an apparatus and method for controlling steering of a platooning vehicle to prevent a trailer from departing from the road on a curved road by controlling steering of a tractor in consideration of a distance between the center of an overall width of the trailer and a left lane and a distance between the center of the overall width of the trailer and a right lane.

18 Claims, 6 Drawing Sheets

APPARATUS AND METHOD FOR CONTROLLING STEERING OF PLATOONING VEHICLE

CROSS REFERENCE TO RELATED APPLICATION

This application is claims the benefit of priority to Korean Patent Application No. 10-2018-0136086, filed in the Korean Intellectual Property Office on Nov. 7, 2018, the entire contents of which are incorporated herein by reference.

TECHNICAL FIELD

The present disclosure relates to an apparatus and method for controlling steering of a platooning vehicle.

BACKGROUND

In general, in the situation where several vehicles travel simultaneously to one destination, when most drivers do not know a road to the destination and when one driver knows the road, when persons want to move using a specific path among several paths to the destination because there is a person who knows a shortcut through a side road, when persons move to look for a good place without a specific destination, or when persons pass an undecided stop such as a rest area during movement to the destination, platooning is performed to prevent a vehicle from parting from accompanying vehicles.

In such platooning, several vehicles move together while maintaining a minimum safety distance. When such platooning is performed, air resistance of following vehicles may be reduced to enhance gas mileage, the risk of accident may be reduced, and convenience of a driver of each vehicle may be increased. An interval between vehicles may be reduced to increase the number of vehicles which use the road 3 to 5 times.

Recently, technologies capable of performing platooning of each vehicle in the state where a driver does not ride in a following vehicle which follows a leading vehicle as well as the leading vehicle have been developed.

A conventional technology of controlling steering of platooning vehicles is applied to an integrated vehicle such as a sedan, a van, or a truck. In case of a vehicle, such as a tractor trailer, a tractor and a trailer of which are connected by a coupler, the trailer is bent at a certain angle from the tractor when the tractor travels on a curved road, such that the conventional technology is difficult to be applied to the tractor trailer.

In other words, in the tractor trailer, a type (size) of the trailer connected to the tractor is frequently changed and an angle bent on a curved road varies with the weight of freight carried on the trailer. Thus, the conventional technology of controlling steering of the tractor to follow the center of the road does not prevent the trailer from departing from the curved road.

SUMMARY

The present disclosure has been made to solve the above-mentioned problems occurring in the prior art while advantages achieved by the prior art are maintained intact.

An aspect of the present disclosure provides an apparatus and method for controlling steering of a platooning vehicle to prevent a trailer from departing from the road on a curved road by controlling steering of a tractor in consideration of a distance between the center of an overall width of the trailer and a left lane and a distance between the center of the overall width of the trailer and a right lane.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling steering of a platooning vehicle may include: a sensor configured to measure a distance from the center of an overall width of a leading vehicle (LV) tractor to a left lane and a distance from the center of the overall width of the LV tractor to a right lane, a communication device configured to receive distance data from the center of an overall width of an LV trailer to the left lane and distance data from the center of the overall width of the LV trailer to the right lane from a following vehicle (FV), and a controller configured to control steering of the LV tractor based on the measured distance from the center of the overall width of the LV tractor to the left lane and the measured distance from the center of the overall width of the LV tractor to the right lane, the received distance data from the center of the overall width of the LV trailer to the left lane and the received distance data from the center of the overall width of the LV trailer to the right lane, and a vehicle width of the LV tractor.

The apparatus may further include a navigation device configured to provide information about a rotational direction and a curvature of a road where the LV is traveling. The controller may be configured to control the steering of the LV tractor, when the curvature is less than a reference value.

The controller may be configured to apply different steering control offsets (SCOs) depending on whether a road where the LV is traveling is a left curved road or a right turned road.

According to another aspect of the present disclosure, a method for controlling steering of a platooning vehicle may include: measuring, by a sensor of the LV, a distance from the center of an overall width of an LV tractor to a left lane and a distance from the center of the overall width of the LV tractor to a right lane, receiving, by a communication device of the LV, distance data from the center of an overall width of an LV trailer to the left lane and distance data from the center of the overall width of the LV trailer to the right lane from an FV, and controlling, by a controller of the LV, steering of the LV tractor based on the measured distance from the center of the overall width of the LV tractor to the left lane and the measured distance from the center of the overall width of the LV tractor to the right lane, the received distance data from the center of the overall width of the LV trailer to the left lane and the received distance data from the center of the overall width of the LV trailer to the right lane, and a vehicle width of the LV tractor.

The method may further include providing, by a navigation device of the LV, information about a rotational direction and a curvature of a road where the LV is traveling. The controlling of the steering of the LV tractor may be performed when the curvature is less than a reference value.

The controlling of the steering of the LV tractor may include applying an $SCO_{Left}$, when a road where the LV is traveling is a left curved road and applying an $SCO_{Right}$, when the road is a right curved road.

According to another aspect of the present disclosure, an apparatus for controlling steering of a platooning vehicle may include: a sensor configured to measure a distance from the center of an overall width of an LV tractor to a left lane and a distance from the center of the overall width of the LV tractor to a right lane and measure a distance from the center of an overall width of an LV trailer to the left lane and a distance from the center of the overall width of the LV trailer to the right lane and a controller configured to control steering of the LV tractor based on the measured distance from the center of the overall width of the LV tractor to the left lane and the measured distance from the center of the overall width of the LV tractor to the right lane, the measured distance from the center of the overall width of the LV trailer to the left lane and the measured distance from the center of the overall width of the LV trailer to the right lane, and a vehicle width of the LV tractor.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms $1^{st}$ $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In an embodiment of the present disclosure, a tractor trailer is collectively called a vehicle, a tractor and a trailer of which are connected through a coupler. Herein, the trailer refers to a vehicle which carries freight without its power source, and the tractor refers to a vehicle which tows the trailer with its power source.

Figure 1:
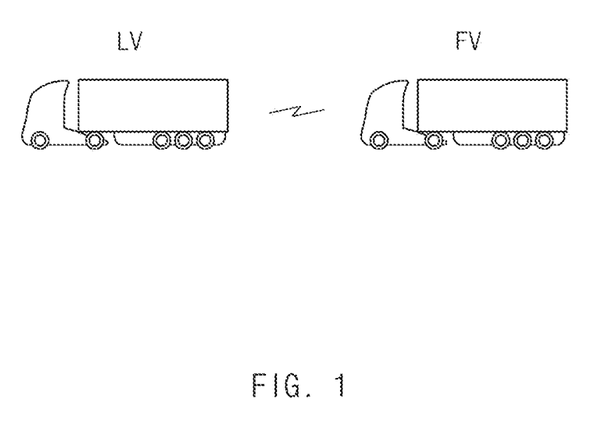
FIG. 1 is a drawing illustrating a platooning environment to which an embodiment of the present disclosure is applied.

FIG. 1 is a drawing illustrating a platooning environment to which an embodiment of the present disclosure is applied.

As shown in FIG. 1, the platooning environment to which an embodiment of the present disclosure is applied may indicate a situation where a following vehicle (FV) follows a leading vehicle (LV).

The LV and the FV may transmit and receive a variety of driving information over vehicle to vehicle (V2V) communication. Particularly, the LV may transmit braking information, speed information, steering information, or the like as driving information to the FV. The FV may measure a distance from the center of an overall width of the LV to a left lane and a distance from the center of the overall width of the LV to a right lane and may transmit the measured distance information to the LV. In this case, the FV may measure the distance by means of a tail end image of the LV, obtained using its camera, and may measure the distance using its radar. The FV may use the camera and the radar in a complementary manner to measure the distance.

An embodiment of the present disclosure is exemplified as the LV and the FV are tractor trailers. However, embodiments are not limited thereto.

Figure 2:
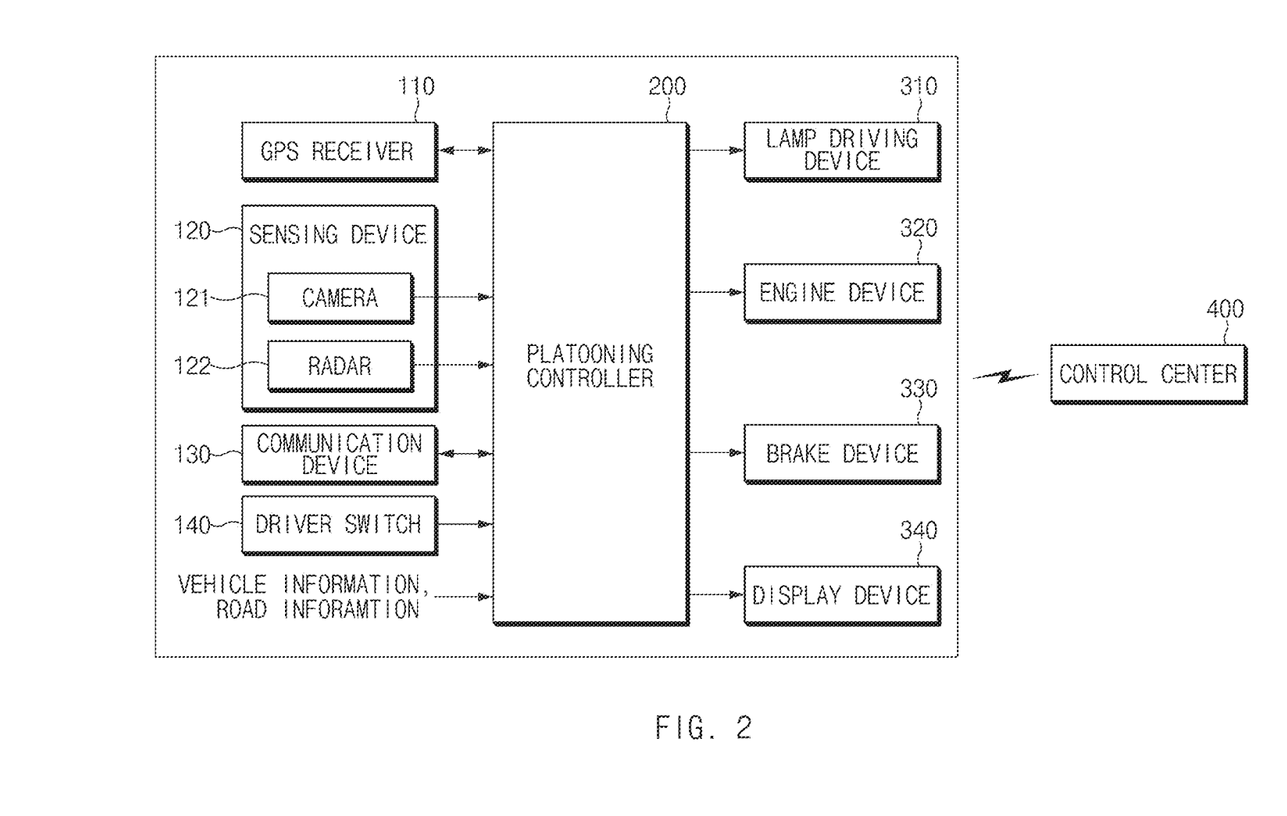
FIG. 2 is a block diagram illustrating a platooning system included in a vehicle to which an embodiment of the present disclosure is applied.

FIG. 2 is a block diagram illustrating a platooning system included in a vehicle to which an embodiment of the present disclosure is applied.

As shown in FIG. 2, the platooning system included in the vehicle to which an embodiment of the present disclosure is applied may include a global positioning system (GPS) receiver 110, a sensing device 120, a communication device 130, a driver switch 140, a platooning controller 200, a lamp driving device 310, an engine device 320, a braking device 330, and a display device 340 and may transmit and receive weather forecast information and platooning information with a control center 400.

The GPS receiver 110 may receive GPS information and may provide the received GPS information to the platooning controller 200. Thus, the platooning controller 200 may ascertain a position of a host vehicle.

The sensing device 120 may sense a front road state, a weather state, or the like and may include a camera 121 and a radar 122. The sensing device 120 may be controlled by the platooning controller 200. When it snows or rains, because there is a high probability that an error will occur in image data of the camera 121, the platooning controller 200 may turn off the camera 121 and may determine a road state and a weather state using only data of the radar 122. Furthermore, the sensing device 120 may obtain a relative distance between vehicles, a relative speed between the vehicles, lane information, or the like and may provide the obtained information to the platooning controller 200.

The communication device 130 may perform V2V communication and may transmit and receive platooning related information, weather forecast information, or the like with the control center 400.

The driver switch 140 may be a module for inputting platooning request and acceptance. When receiving a platooning related agreement request such as a platooning level and a platooning sequence from a leading vehicle or the control center 400, the driver may turn on/off the driver switch 140 and may provide his or her opinion. When the driver turns on the driver switch 140, the platooning controller 200 may determine that the driver accepts platooning.

Furthermore, information associated with a vehicle cargo box or information about map and traffic situations may be input to the platooning controller 200.

When receiving a command to drive a vehicle lamp for platooning control from the platooning controller 200, the lamp driving device 310 may drive the vehicle lamp. In other words, the lamp driving device 310 may drive a lamp corresponding to a turn signal, a stop signal, a platooning mode signal, or the like.

When receiving an acceleration command from the platooning controller 200, the engine device 320 may accelerate the vehicle.

When receiving a deceleration command from the platooning controller 200, the braking device 330 may decelerate the vehicle.

The display device 340 may display platooning situation information such as information indicating whether to generate a platoon, information about a leading vehicle, and information about an inter-vehicle distance and may include a cluster, a head-up display (HUD), a navigation terminal, an audio, video, navigation (AVN) system, or the like. In FIG. 2, an embodiment is exemplified as the configuration for displaying platooning situation information on the display device 340 configured independently of the platooning controller 200. However, embodiments are not limited thereto. For example, a display device may be included in the platooning controller 200 to display platooning situation information.

The display device 340 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, and a three-dimensional (3D) display. Some thereof may be implemented as transparent displays configured as a transparent type or a semi-transparent type to see the outside.

The platooning controller 200 may determine a weather environmental state based on weather forecast information received from the control center 400 or weather information sensed by the sensing device 120 and may determine a platooning level according to the weather environmental state, thus controlling platooning.

Figure 3:
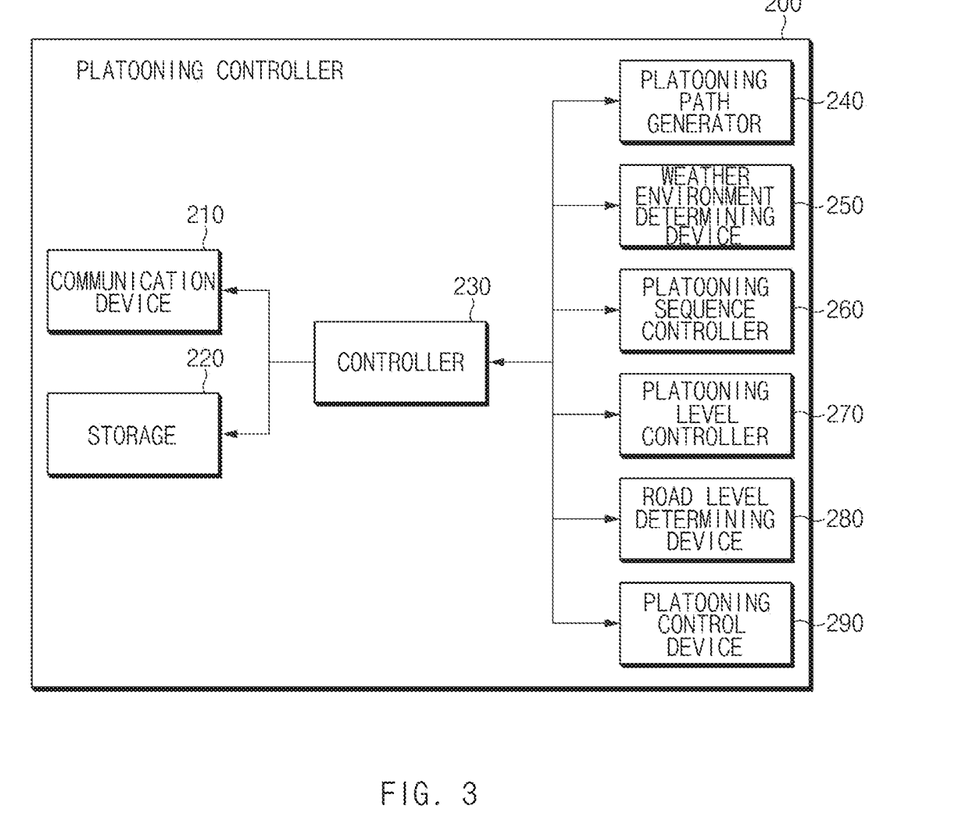
FIG. 3 is a block diagram illustrating a platooning controller of a platooning system included in a vehicle to which an embodiment of the present disclosure is applied.

As shown in FIG. 3, the platooning controller 200 may include a communication device 210, a storage 220, a controller 230, a platooning path generator 240, a weather environment determining device 250, a platooning sequence controller 260, a platooning level controller 270, a road level determining device 280, and a platooning control device 290.

Herein, the communication device 210 may perform controller area network (CAN) communication or the like with an inter-vehicle device.

The storage 220 may store information transmitted and received over inter-vehicle communication, information calculated in the platooning controller 200, or the like.

The storage 220 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The controller 230 may control an overall operation of each component of the platooning controller 200.

The platooning path generator 240 may generate a platooning path include a point a platoon starts, a point the platoon joins, and a point at which the platoon arrives, when forming the platoon.

The weather environment determining device 250 may determine a weather environment on the platooning path. In other words, the weather environment determining device 250 may receive weather forecast information from the control center 400 or may obtain weather information using the result measured from the sensing device 120 of the vehicle, and may determine a weather environmental state and a road state (a road surface state) according to the weather environmental state. For example, when it snows or rains on a platooning path or at a platooning time on weather forecast information, the weather environment determining device 250 may determine that there is a bad weather environment.

The platooning sequence controller 260 may determine a platooning sequence based on the weather environmental state. In other words, when there is a normal weather environment, the platooning sequence controller 260 may consider at least one or more of a payload weight, a platooning path, gas mileage, or a braking force in a complex manner to determine a platooning sequence. For example, the platooning sequence controller 260 may select a vehicle with a weak braking force and a bad gas mileage or a vehicle with many payloads as a leading vehicle and may locate a vehicle with a strong braking force and with a little payload behind a platoon because of quickly coping with emergency braking.

Meanwhile, when there is a bad weather environment due to snow or rain, the platooning sequence controller 260 may determine a platooning sequence based on a braking force. In other words, when there is the bad weather environment, the platooning sequence controller 260 may select a vehicle with the weakest braking force as a leading vehicle and may select a vehicle with a subsequently weak braking force as a first following vehicle immediately behind the leading vehicle. An order of the subsequent following vehicles may be determined as an order where a braking force is weak. As a result, when a road surface is wet due to snow, rain, or the like, because a braking distance is long, a platooning sequence may be determined in an order where a braking force is weak.

The platooning level controller 270 may determine a platooning level. In this case, the platooning level may be determined in consideration of various typical conditions, for example, the number of platooning vehicles, a payload weight of the platooning vehicles, a platooning path distance, and whether there is road construction. For example, the platooning level may be classified as a first level Lv.1 in which platooning is not performed, a second level Lv.2 in which only a longitudinal inter-vehicle distance is controlled during platooning, or a third level Lv.3 in which a longitudinal inter-vehicle distance, a lateral inter-vehicle distance, and steering are controlled during platooning. In other words, the platooning level controller 270 may determine a situation where it is impossible perform platooning (e.g., very bad weather conditions or the like) as the first level, may determine a state where it is possible to perform platooning, but where it is able to perform only longitudinal control because it is dangerous to perform lateral control as the second level, and may determine a good weather environment as the third level capable of performing all control associated with platooning.

The platooning level controller 270 may determine a platooning level depending on a road level determined by the road level determining device 280.

The road level determining device 280 may determine a lane state or a road level based on the measured weather information or the road information. In this case, the road level determining device 280 may recognize the lane state from image data of a camera. The road level determining device 280 may determine the road level using one or more of the result of sensing snow or rain by a vehicle sensor (a sensing device), a slip ratio of an electronic stability control (ESC), or a lane state of a road. Furthermore, when the platooning level is the third level, the road level determining device 280 may determine a lane state of the road on a platooning path.

The platooning control device 290 may control platooning depending on the platooning level determined by the platooning level controller 270. In this case, the controlling of the platooning may refer to controlling a speed of a vehicle, a longitudinal inter-vehicle distance, a lateral inter-vehicle distance, or the like. The platooning control device 290 may fail to perform platooning when the platooning level is the first level and may perform longitudinal control when the platooning level is the second level, thus performing longitudinal control, lateral control, steering control, or the like when the platooning level is the third level.

Moreover, the platooning control device 290 may control lateral and longitudinal inter-vehicle distances depending on the result of determining the lane state or the road level by the road level determining device 280 as well as the platooning level. In other words, the platooning control device 290 may control to maintain inter-lane driving independently of a behavior of an LV when the lane state is good (greater than or equal to a first reference value) and may perform LV following control for following the LV when the lane state is bad (less than the first reference value). In this case, the platooning control device 290 may follow a path, a speed, or the like of the LV through an LV following lane and the radar 122 which is a little infected by a weather environment.

The platooning control device 290 may determine a longitudinal inter-vehicle distance as a first distance value (e.g., 10 m) when the road level is good (greater than or equal to a second reference value) and may determine the longitudinal inter-vehicle distance as a second distance value (e.g., 20 m) greater than the first distance value when the road level is bad (less than the second reference value) to ensure safety upon emergency braking. When the platooning level is the second level for performing only longitudinal control or when the road level is bad (less than the second reference value), the platooning control device 290 may turn off a front or side view camera of the vehicle. In other words, when the platooning level is the second level and when the road level is bad, because the camera 121 misrecognizes a forward object and has a bad influence on platooning, the platooning control device 290 may turn off the camera 121.

Figure 4:
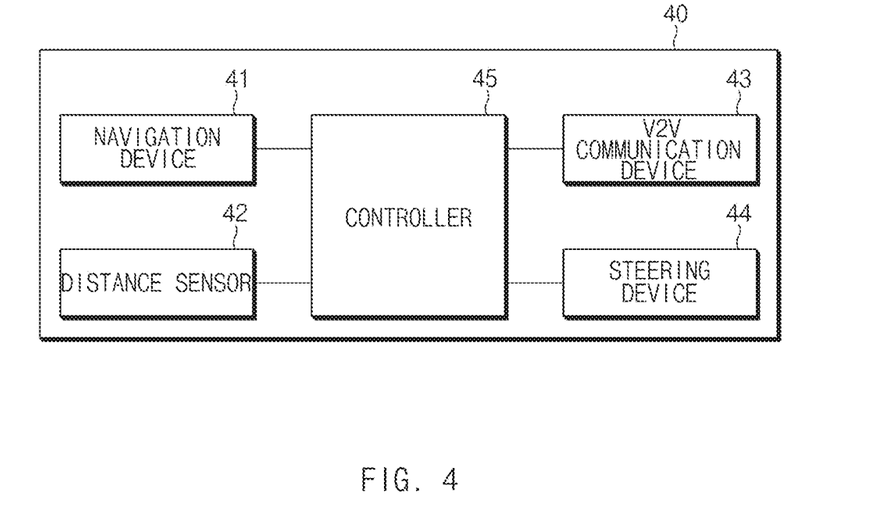
FIG. 4 is a block diagram illustrating a configuration of a steering controller of a platooning vehicle according to an embodiment of the present disclosure.

FIG. 4 is a block diagram illustrating a configuration of an apparatus for controlling steering of a platooning vehicle according to an embodiment of the present disclosure. In FIG. 4, for better understanding, an embodiment is exemplified as an apparatus for controlling steering of a platooning vehicle according to an embodiment of the prevent disclosure is loaded into an LV. However, embodiments are not limited thereto. For example, the apparatus for controlling the steering of the platooning vehicle according to an embodiment of the prevent disclosure is loaded into an FV.

As shown in FIG. 4, an apparatus 40 for controlling steering of a platooning vehicle according to an embodiment of the present disclosure may include a navigation device 41, a distance sensor 42, a V2V communication device 43, a steering device 44, and a controller 45. Meanwhile, the components may be integrated into one in a manner which performs the apparatus 40 for controlling the steering of the platooning vehicle according to an embodiment of the present disclosure. Some of the components may be omitted in a manner which performs the apparatus 40 for controlling the steering of the platooning vehicle according to an embodiment of the present disclosure.

Seeing the components, first of all, the navigation device 41 may provide information about a curved lane of a road where an LV is traveling. Herein, the curved lane information may include a rotational direction or a curvature of the road.

The navigation device 41 may include a global positioning system (GPS) module for receiving a GPS signal received from a satellite and generating its first location data based on the received GPS signal, a dead reckoning (DR) sensor for generating second location data based on a driving direction of the LV and a speed of the LV, a storage (memory) for storing map data and a variety of information, a map matching device for generating an estimated location of the LV based on the first location data and the second location data, matching the generated estimated location to a link (a map matching link or a map matching road) in the map data stored in the storage, and outputting the matched map information (the result of matching the map), a communication device for performing telephone communication over a wireless communication network, a controller for generating navigation information based on the matched map information (the result of matching the map) or generating and transmitting information about a state (e.g., a dangerous state or a failure state) of a surrounding vehicle, or receiving state information of a host vehicle from the surrounding vehicle, a display device for displaying a navigation map (including information about an area of interest) included in the navigation information or displaying information about a state of the host vehicle, and a sound output device for outputting navigation voice information (a navigation voice message) included in the navigation information. Herein, the communication device may include a handsfree device having a Bluetooth module.

The distance sensor 42 may be a sensor, loaded into the front of a tractor, which measures a distance from the center of an overall width of the tractor to a left lane and a distance from the center of the overall width of the tractor to a right lane. The distance sensor 42 may be implemented as a radar, an ultrasonic sensor, or the like.

The distance sensor 42 may measure a distance from the center of an overall width of a trailer to the left lane and a distance from the center of the overall width of the trailer to the right lane, using a radar or an ultrasonic sensor loaded into the rear of the trailer.

The V2V communication device 43 may communicate with an FV which is traveling immediately behind the LV and may receive distance data from the center of the overall width of the trailer of the LV to the left lane and distance data from the center of the overall width of the trailer to the right lane from the FV.

The steering device 44 may control steering of the LV based on a steering control offset (SCO) set by the controller 45.

The controller 45 may perform overall control such that the components normally perform their own function. Such a controller 45 may be implemented in the form of hardware or software or may be implemented in the form of a combination of hardware and software. Preferably, the controller 45 may be implemented as, but not limited to, a microprocessor.

The controller 45 may control steering of the tractor in consideration of the distance from the center of the overall width of the trailer to the left lane and the distance from the center of the overall width of the trailer to the right lane to prevent the trailer from departing from the driving road on a curved road.

In other words, the controller 45 may control steering of the tractor based on the rotational direction and curvature of the road, obtained by means of the navigation device 41. For example, the controller 45 may determine whether the road where the LV is currently traveling is a curved road. When the road is the curved road, the controller 45 may determine whether the road is a left curved road or a right curved road and may determine how much curvature is.

Furthermore, it is preferable that the controller 45 controls steering of the tractor when the curvature is less than a reference value (e.g., when a radius of the road is less than a threshold (e.g., 300 m)). However, embodiments are not limited thereto.

Moreover, it is preferable that the controller 45 does not control steering of the tractor upon a lane change. In this case, the controller 45 may determine whether a lane change is performed, based on turning on/off a turn signal lamp.

Furthermore, the controller 45 may apply different SCOs depending on whether the road where the LV is traveling is a left curved road or a right curved road. Hereinafter, a description will be given in detail of this with reference to FIG. 5.

Figure 5:
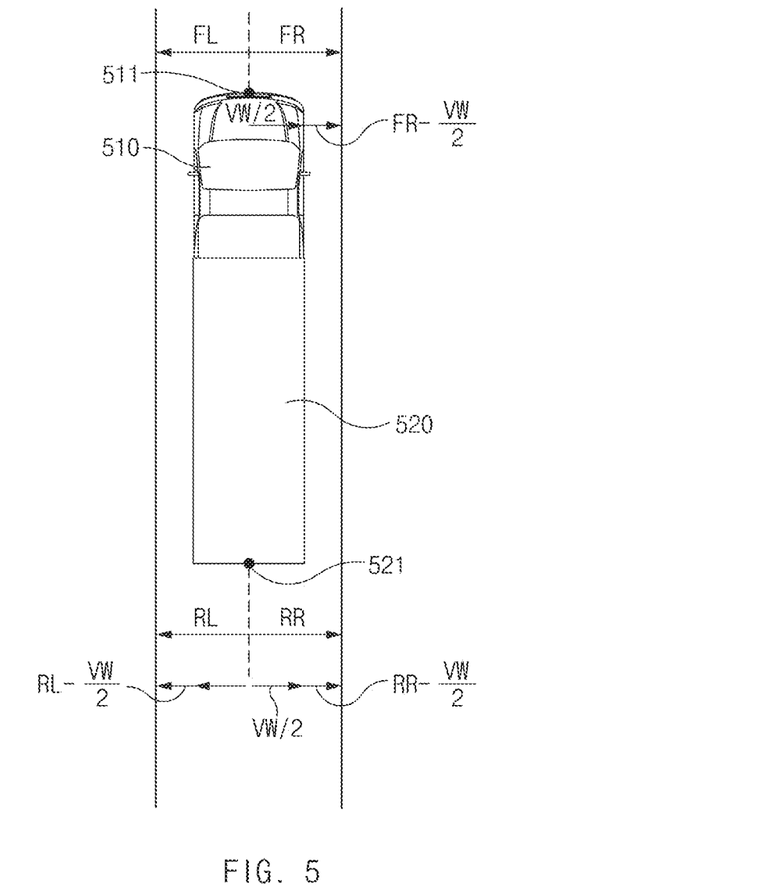
FIG. 5 is a drawing illustrating the definition of variables used to calculate a steering control offset (SCO) according to an embodiment of the present disclosure.

FIG. 5 is a drawing illustrating the definition of variables used to calculate a steering control offset (SCO) according to an embodiment of the present disclosure. In FIG. 5, reference numeral '510' denotes a tractor, and reference numeral '520' denotes a trailer. Reference denotation 'VW' refers to a vehicle width of the tractor 510 and a vehicle width of the trailer 520. In this case, the vehicle width of the tractor 510 and the vehicle width of the trailer 520 may be the same as each other.

Reference denotation 'FL' denotes a distance from the center 511 of an overall width of the tractor 510 to a left lane, and reference denotation 'FR' denotes a distance from the center 511 of the overall width of the tractor 510 to a right lane. Reference denotation 'RL' denotes a distance from the center 521 of an overall width of the trailer 520 to the left lane, and reference denotation 'RR' denotes a distance from the center 521 of the overall width of the trailer 520 to the right lane.

When a road where an LV is traveling is a left curved road, a controller 45 of FIG. 4 may adjust an $SCO_{Left}$ based on Equation (1) below.

$$SCO_{Left} = \left(1 - \frac{2RL - VW}{2RR - VW}\right)\left(FR - \frac{VW}{2}\right) \text{ where, } RL < RR \quad (1)$$

In this case, when RL≥RR, there is no need to adjust the SCO.

When the road where the LV is traveling is a right curved road, the controller 45 may adjust an $SCO_{Right}$ based on Equation (2) below.

$$SCO_{Right} = \left(1 - \frac{2RR - VW}{2RL - VW}\right)\left(FR - \frac{VW}{2}\right) \text{ where, } RR < RL \quad (2)$$

In this case, when RR≥RL, there is no need to adjust the SCO.

Meanwhile, the controller 45 may include its own memory and may store a vehicle width of a tractor of the LV.

Figure 6:
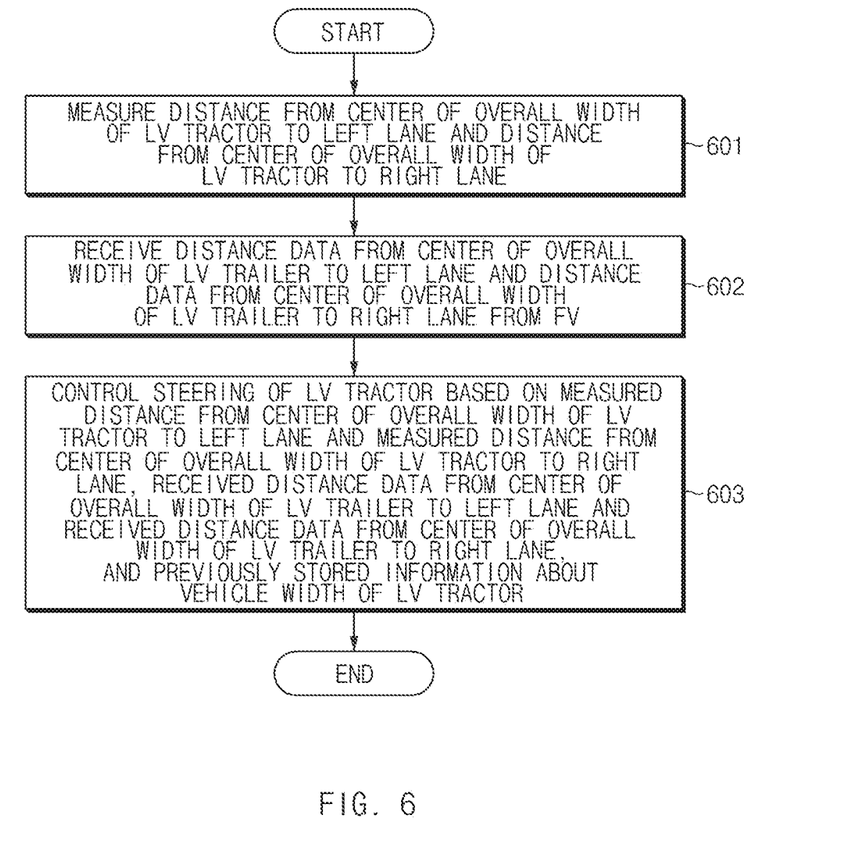
FIG. 6 is a flowchart illustrating a method for controlling steering of a platooning vehicle according to an embodiment of the present disclosure.

FIG. 6 is a flowchart illustrating a method for controlling steering of a platooning vehicle according to an embodiment of the present disclosure.

First of all, in operation 601, a distance sensor 42 of FIG. 4 may measure a distance from the center of an overall width of an LV tractor to a left lane and a distance from the center of the overall width of the LV tractor to a right lane.

In operation 602, a V2V communication device 43 of FIG. 4 may receive distance data from the center of an overall width of an LV trailer to the left lane and distance data from the center of the overall width of the LV trailer to the right lane.

In operation 603, a controller 45 of FIG. 4 may control steering of the LV tractor based on the measured distance from the center of the overall width of the LV tractor to the left lane and the measured distance from the center of the overall width of the LV tractor to the right lane, the received distance data from the center of the overall width of the LV trailer to the left lane and the received distance data from the center of the overall width of the LV trailer to the right lane, and previously stored information about a vehicle width of the LV tractor. In this case, when a road where an LV is traveling is a left curved road, the controller 45 may adjust an $SCO_{Left}$ based on Equation (1) above. When the road where the LV is traveling is a right curved road, the controller 45 may adjust an $SCO_{Right}$ based on Equation (2) above.

Through such processes, an embodiment of the present disclosure may prevent a tail end (a rear wheel) of the trailer of the tractor trailer which performs platooning from departing from the road on a curved road, irrespective of a type, a size, a weight, or the like of the trailer.

The apparatus and method for controlling the steering of the platooning vehicle may prevent the trailer from departing from the road on the curved road by controlling steering of the tractor in consideration of a distance between the center of the overall width of the trailer and a left lane and a distance between the center of the overall width of the trailer and a right lane.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. An apparatus for controlling steering of a platooning vehicle, the apparatus comprising:
    a sensor configured to measure a distance from the center of an overall width of a leading vehicle (LV) tractor to a left lane and a distance from the center of the overall width of the LV tractor to a right lane;
    a communication device configured to receive distance data from the center of an overall width of an LV trailer to the left lane and distance data from the center of the overall width of the LV trailer to the right lane from a following vehicle (FV); and a controller configured to control steering of the LV tractor based on the measured distance from the center of the overall width of the LV tractor to the left lane and the measured distance from the center of the overall width of the LV tractor to the right lane, the received distance data from the center of the overall width of the LV trailer to the left lane and the received distance data from the center of the overall width of the LV trailer to the right lane, and a vehicle width of the LV tractor.

2. The apparatus of claim 1, further comprising:
a navigation device configured to provide information about a rotational direction and a curvature of a road where the LV is traveling.

3. The apparatus of claim 2, wherein the controller is configured to:
control the steering of the LV tractor, when the curvature is less than a reference value.

4. The apparatus of claim 1, wherein the controller is configured to:
apply different steering control offsets (SCOs) depending on whether a road is a left curved road or a right turned road.

5. The apparatus of claim 4, wherein the controller is configured to:
adjust an SCO$_{Left}$ based on the equation $$SCO_{Left} = \left(1 - \frac{2RL - VW}{2RR - VW}\right)\left(FR - \frac{VW}{2}\right) \text{ where, } RL < RR,$$

when the road is the left curved road,
where VW denotes the vehicle width of the tractor, FL denotes the distance from the center of the overall width of the tractor to the left lane, FR denotes the distance from the center of the overall width of the tractor to the right lane, RL denotes the distance from the center of the overall width of the trailer to the left lane, and RR denotes the distance from the center of the overall width of the trailer to the right lane.

6. The apparatus of claim 4, wherein the controller is configured to:
adjust an SCO$_{right}$ based on the equation $$SCO_{Right} = \left(1 - \frac{2RR - VW}{2RL - VW}\right)\left(FL - \frac{VW}{2}\right) \text{ where, } RR < RL,$$

when the road is the right curved road,
where VW denotes the vehicle width of the tractor, FL denotes the distance from the center of the overall width of the tractor to the left lane, FR denotes the distance from the center of the overall width of the tractor to the right lane, RL denotes the distance from the center of the overall width of the trailer to the left lane, and RR denotes the distance from the center of the overall width of the trailer to the right lane.

7. A method for controlling steering of a platooning vehicle, the method comprising:
measuring, by a sensor, a distance from the center of an overall width of an a leading vehicle (LV) tractor to a left lane and a distance from the center of the overall width of the LV tractor to a right lane;
receiving, by a communication device, distance data from the center of an overall width of an LV trailer to the left lane and distance data from the center of the overall width of the LV trailer to the right lane from an FV; and controlling, by a controller, steering of the LV tractor based on the measured distance from the center of the overall width of the LV tractor to the left lane and the measured distance from the center of the overall width of the LV tractor to the right lane, the received distance data from the center of the overall width of the LV trailer to the left lane and the received distance data from the center of the overall width of the LV trailer to the right lane, and a vehicle width of the LV tractor.

8. The method of claim 7, further comprising:
providing, by a navigation device, information about a rotational direction and a curvature of a road where LV is traveling.

9. The method of claim 8, wherein the controlling of the steering of the LV tractor is performed when the curvature is less than a reference value.

10. The method of claim 7, wherein the controlling of the steering of the LV tractor comprises:
applying a first steering control offset, when a road is a left curved road; and
applying a second steering control offset, when the road is a right curved road.

11. The method of claim 10, wherein the first steering control offset (SCO$_{Left}$) is obtained based on the equation $$SCO_{Left} = \left(1 - \frac{2RL - VW}{2RR - VW}\right)\left(FR - \frac{VW}{2}\right) \text{ where, } RL < RR,$$

where VW denotes the vehicle width of the tractor, FL denotes the distance from the center of the overall width of the tractor to the left lane, FR denotes the distance from the center of the overall width of the tractor to the right lane, RL denotes the distance from the center of the overall width of the trailer to the left lane, and RR denotes the distance from the center of the overall width of the trailer to the right lane.

12. The method of claim 10, wherein the second steering control offset (SCO$_{Right}$ is obtained based the equation $$SCO_{Right} = \left(1 - \frac{2RR - VW}{2RL - VW}\right)\left(FL - \frac{VW}{2}\right) \text{ where, } RR < RL,$$

where VW denotes the vehicle width of the tractor, FL denotes the distance from the center of the overall width of the tractor to the left lane, FR denotes the distance from the center of the overall width of the tractor to the right lane, RL denotes the distance from the center of the overall width of the trailer to the left lane, and RR denotes the distance from the center of the overall width of the trailer to the right lane.

13. An apparatus for controlling steering of a platooning vehicle, the apparatus comprising:
a sensor configured to measure a distance from the center of an overall width of a leading vehicle (LV) tractor to a left lane and a distance from the center of the overall width of the LV tractor to a right lane and measure a distance from the center of an overall width of an LV trailer to the left lane and a distance from the center of the overall width of the LV trailer to the right lane; and
a controller configured to control steering of the LV tractor based on the measured distance from the center of the overall width of the LV tractor to the left lane and the measured distance from the center of the overall width of the LV tractor to the right lane, the measured distance from the center of the overall width of the LV trailer to the left lane and the measured distance from the center of the overall width of the LV trailer to the right lane, and a vehicle width of the LV tractor.

14. The apparatus of claim 13, further comprising:
a navigation device configured to provide information about a rotational direction and a curvature of a road where LV is traveling.

15. The apparatus of claim 14, wherein the controller is configured to:
control the steering of the LV tractor, when the curvature is less than a reference value.

16. The apparatus of claim 13, wherein the controller is configured to:
apply different steering control offsets (SCOs) depending on whether a road is a left curved road or a right turned road.

17. The apparatus of claim 16, wherein the controller is configured to:
adjust $SCO_{Left}$ based on the equation $$SCO_{Left} = \left(1 - \frac{2RL - VW}{2RR - VW}\right)\left(FR - \frac{VW}{2}\right) \text{ where, } RL < RR,$$

when the road is the left curved road, where VW denotes the vehicle width of the tractor, FL denotes the distance from the center of the overall width of the tractor to the left lane, FR denotes the distance from the center of the overall width of the tractor to the right lane, RL denotes the distance from the center of the overall width of the trailer to the left lane, and RR denotes the distance from the center of the overall width of the trailer to the right lane.

18. The apparatus of claim 16, wherein the controller is configured to:
adjust $SCO_{Right}$ based on the equation $$SCO_{Right} = \left(1 - \frac{2RR - VW}{2RL - VW}\right)\left(FL - \frac{VW}{2}\right) \text{ where, } RR < RL,$$

when the road is the right curved road, where VW denotes the vehicle width of the tractor, FL denotes the distance from the center of the overall width of the tractor to the left lane, FR denotes the distance from the center of the overall width of the tractor to the right lane, RL denotes the distance from the center of the overall width of the trailer to the left lane, and RR denotes the distance from the center of the overall width of the trailer to the right lane.

* * * * *